United States Patent
Drechsler et al.

(10) Patent No.: US 9,097,286 B2
(45) Date of Patent: Aug. 4, 2015

(54) COUPLING FOR CONNECTING TWO SHAFT SECTIONS, IN PARTICULAR OF A STEERING SHAFT, IN A DAMPING MANNER, STEERING SHAFT, AND METHOD FOR PRODUCING A CORRESPONDING COUPLING

(75) Inventors: Armin Drechsler, Schonberg (DE); Udo Poeppelbaum, Taufkirchen (DE); Jan Hoffmann, Waldkraiburg (DE); Markus Morawietz, Isen (DE); Stephan Petrik, Rechtmehring (DE); Andreas Eicher, Jettenbach (DE); Josef Stubenrauch, Rott Am Inn (DE)

(73) Assignee: SGF Sueddeutsche Gelenkscheibenfabrik GmbH & Co. KG (DE)

( * ) Notice: Subject to any disclaimer, the term of this patent is extended or adjusted under 35 U.S.C. 154(b) by 0 days.

(21) Appl. No.: 13/979,010

(22) PCT Filed: Jan. 12, 2012

(86) PCT No.: PCT/EP2012/000131
§ 371 (c)(1),
(2), (4) Date: Sep. 23, 2013

(87) PCT Pub. No.: WO2012/095319
PCT Pub. Date: Jul. 19, 2012

(65) Prior Publication Data
US 2014/0018177 A1    Jan. 16, 2014

(30) Foreign Application Priority Data
Jan. 12, 2011 (DE) .......................... 10 2011 008 396

(51) Int. Cl.
*F16D 3/68* (2006.01)
*F16D 3/76* (2006.01)
(Continued)

(52) U.S. Cl.
CPC ........ *F16D 3/76* (2013.01); *B62D 7/224* (2013.01); *F16D 3/68* (2013.01); *F16F 15/126* (2013.01); *Y10T 29/49826* (2015.01)

(58) Field of Classification Search
USPC ................. 464/75, 89–91; 267/279, 281, 282
See application file for complete search history.

(56) References Cited

U.S. PATENT DOCUMENTS 4,109,979 A * 8/1978 Estaque .................... 267/279 X
4,634,108 A * 1/1987 Munch .......................... 267/279
(Continued)

FOREIGN PATENT DOCUMENTS

DE          102 25 672 A1    1/2003
DE     10 2004 051566 A1    5/2006
(Continued)

*Primary Examiner* — Gregory Binda
(74) *Attorney, Agent, or Firm* — Carter, DeLuca, Farrell & Schmidt, LLP

(57) ABSTRACT

A coupling is provided for connecting two shaft sections in a damping manner, including a bushing arrangement having a radially inner bushing and a radially outer bushing, wherein the radially inner bushing can be coupled to a first shaft section and the radially outer bushing can be coupled to a second shaft section so as to transmit torque, wherein a damping layer is provided between the radially inner bushing and the radially outer bushing. The bushing arrangement can have a circumferentially wave-shaped contour, wherein the radially inner bushing and the radially outer bushing have shafts that mesh with each other, and wherein the damping layer is provided with axial openings, which extend reciprocally from both axial ends of the coupling into the damping layer so that damping blocks are formed at the axial ends of the coupling between the radially inner and radially outer bushings.

16 Claims, 4 Drawing Sheets

(51) Int. Cl.
*B62D 7/22* (2006.01)
*F16F 15/126* (2006.01)

(56) References Cited

U.S. PATENT DOCUMENTS 5,460,574 A  10/1995  Hobaugh 7,258,615 B2 *  8/2007  Sadakata et al. ............... 464/89

FOREIGN PATENT DOCUMENTS

| EP | 1 260 725 A2 | | 11/2002 | |
|----|----|----|----|----|
| GB | 538625 | * | 8/1941 | ............ 464/75 |
| JP | 2007-120592 A | | 5/2007 | |
| WO | 2010-102611 A1 | | 9/2010 | |

* cited by examiner

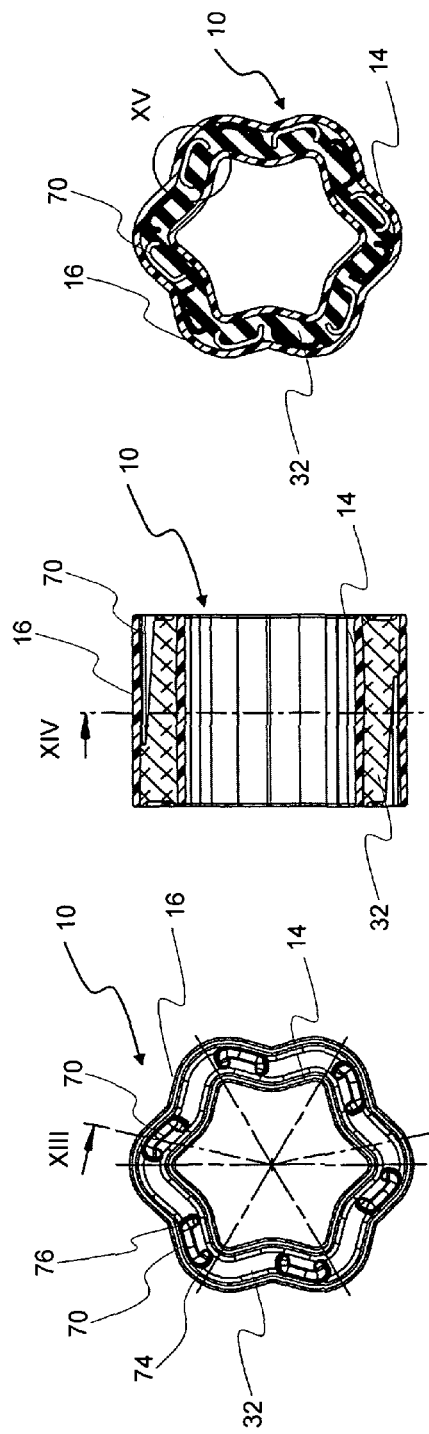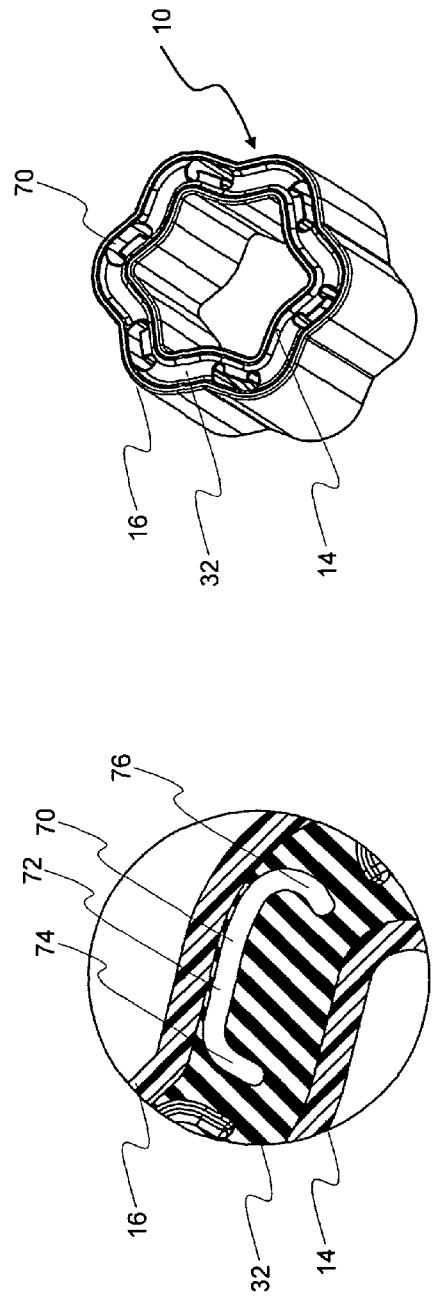

COUPLING FOR CONNECTING TWO SHAFT SECTIONS, IN PARTICULAR OF A STEERING SHAFT, IN A DAMPING MANNER, STEERING SHAFT, AND METHOD FOR PRODUCING A CORRESPONDING COUPLING

The present invention relates to a coupling for connecting two shaft sections, preferably two shaft sections of a steering shaft for a vehicle steering system, in a damping manner, wherein the coupling comprises a bushing arrangement having, with respect to a central longitudinal axis, a radially inner bushing and a radially outer bushing, wherein the radially inner bushing can be coupled to a first shaft section and the radially outer bushing can be coupled to a second shaft section so as to transmit torque, wherein a damping layer is provided between the radially inner bushing and the radially outer bushing.

A coupling of this type is known from the prior art. The document EP 1 260 725 B2, for example, shows a flexible shaft coupling of this type. In the case of this coupling, provision is made to press a part, which is U-shaped in a longitudinal section, onto a shaft which in the inside of the U-profile receives a tubular body and carries the latter via a damping layer. The damping layer may be variously formed, according to one embodiment, for example, with a zigzag shape. This coupling is relatively complicated to produce and requires in particular a complex bushing arrangement, especially if a zigzag-shaped damping layer is to be used.

A shaft coupling in which isolated damping layers are fitted between the inner bushing and an outer bushing is known from the document DE 102 25 672 A1. However, these damping layers extend over the entire axial length.

A similar solution is disclosed in document JP 2007-120592 A.

The document EP 1 260 725 B2 shows coupling arrangements in which differently shaped damping layers between two cylindrical coupling parts are subjected to shear loading. Couplings of this type are not suitable for transmitting high torques.

It is an object of the present invention to provide a coupling of the type described at the outset, which has advantageous damping properties while being cost-effective and simple to produce.

This object is achieved by a coupling of the type described at the outset, in which it is provided that the bushing arrangement has a circumferentially wave-shaped contour, as viewed in the direction of the longitudinal axis, wherein the radially inner bushing and the radially outer bushing have intermeshing wave contours and wherein the damping layer is provided with axial recesses, which extend alternately from both axial ends of the coupling into the damping layer, so that damping blocks are formed at the axial ends of the coupling between the radially inner and radially outer bushing.

According to the invention, the bushing arrangement comprises only one radially inner bushing and one radially outer bushing, which are of tubular form with a wave-shaped profile complementary to one another and have the damping layer in their interspace. This damping layer does not consist, for example, of a continuous layer, but of individual damping blocks which are arranged alternately, as viewed in the circumferential direction, at the axial ends of the coupling between the radially inner and the radially outer bushing. This results in a loading of the damping layer suitable for the stress involved, without unnecessary damping material being arranged in the interspace. In the case of a torsional stress, as occurs regularly in a steering shaft, the individual damping blocks are subjected substantially to compressive stress, i.e. they are compressed between the individual wave flanks. Depending on the configuration of the wave contour, a greater or lesser compressive stress or shear stress can thus be set, depending on the desired torsional stiffness. In the axial direction, the individual damping blocks are subjected exclusively to shear stress, resulting in a relatively soft axial characteristic. However, such shear stresses are of secondary importance in steering shafts. In the case of bending, the individual damping blocks are in turn subjected mainly to compressive stress with greater or lesser components of a shear stress, depending on the desired bending stiffness. It is also possible to calibrate, i.e. prestress, the damping layer. This can be effected by pressing the latter into the interspace or into the radially outer bushing, or onto the radially inner bushing.

On assembly, the steering shaft can be telescoped with a coupling of this type, i.e. the individual steering shaft sections can be fitted into one another, which simplifies assembly. In a crash situation, the steering shaft can even completely telescope, since—as stated above—on axial loading, are subjected exclusively to shear stress and therefore, given sufficiently large forces, finally become locally detached from the bushing arrangement and thus allow an axial relative movement of the two shaft sections with respect to one another.

With regard to the configuration of the bushing arrangement, according to a development of the invention it can preferably be provided that the bushing arrangement has a star-shaped or cloverleaf-shaped contour, as viewed in the direction of the longitudinal axis. A star-shaped or cloverleaf-shaped contour offers the advantage that mutually facing flanks are formed on the inner and outer bushing, via which flanks mainly compressive forces can be transmitted in the case torsional stress. Shear stresses which are difficult to control can thus be largely prevented, if desired. Moreover, such a star-shaped or cloverleaf-shaped contour offers the further advantage that, even in the event of a failure of the damping layer, the two shaft sections are sufficiently secured against rotation with respect to one another, so that the steering shaft arrangement can continue to transmit torques. The two bushings can be connected to one another concentrically or eccentrically via the damping layer. The concentric arrangement is suitable in the automotive sector. The eccentric arrangement may be considered in assembly mounting in general mechanical engineering. The damping layer is formed either with uniform thickness or variable thickness in the circumferential direction, depending on the intermeshing profiles of the two bushings.

According to the invention, in a variant embodiment it can be provided that the bushing arrangement in its initial state is formed as a one-piece component, wherein the radially inner bushing is connected to the radially outer bushing via at least one connecting web which is formed as a predetermined breaking point and can be broken open by relative displacement of the radially inner bushing with respect to the radially outer bushing. In this case, it is possible for the bushing arrangement to be produced from plastic.

It should be pointed out that the connecting web(s) which act as predetermined breaking points serve additionally also as radial stops, so that a maximum deflection between the radially inner and the radially outer bushing can be defined via these connecting webs.

The damping blocks can be provided between the wave-shaped bushings of the bushing arrangement, according to requirements. Preferably, it is provided that the damping blocks are arranged between the radially inner and radially outer bushing in each case in the region of a flank of an individual wave. In this case, it is possible to arrange the damping blocks regularly or irregularly in limited regions. A preferred embodiment of the invention provides that the damping blocks extend in each case from the wave trough to the wave crest. With such an arrangement of the damping blocks, large damping forces can be taken up and correspondingly large torques transmitted via the damping blocks.

Furthermore, in this connection, it can be provided that the damping blocks is provided at one axial end of the coupling on the respectively leading flank of the individual waves and at the other axial end of the coupling on the respectively trailing flank of the individual waves, as viewed in the circumferential direction about the longitudinal axis. In other words, this means that the damping blocks are formed at the one axial end of the coupling for transmitting torques (compressive stress) in the one direction of rotation and at the other axial end for transmitting torques in the other direction of rotation.

In order to avoid notch effects in the damping layer, a development of the invention provides that the recesses have a rounded geometry adapted to the wave course. Depending on the wave course and flank course of the individual bushings, the recesses are formed more or less rectilinearly. Furthermore, it can be provided that the recesses extend in the radial direction right up to the bushings or that, alternatively thereto, they are enclosed by the material of the damping layer, i.e. that damping layer material is in each case still attached with low thickness to the bushings also in the region of the recesses.

Furthermore, it is also possible for the recesses to have a rounded, angular, C- or U-shaped contour in cross-section. A specific damping behaviour can thus be achieved also via the configuration of the cross-sectional geometry of the recesses. For example, it is possible, in the case of a C- or U-shaped, also crown-shaped, cross-sectional geometry, to achieve only a narrow gap, which may be of crescent-shaped form, as the recess. In the case of a torsional stress of the coupling according to the invention under load, this gap is then deformed as necessary such that it is partially reduced to a nominal size of "zero", which results in an additive quasi-hydrostatic component in the damping behaviour. The torsional stiffness of the component can thereby be markedly increased. Depending on the configuration of the geometry of the gap, a definable progression can be achieved, depending on the loads to be expected.

A development of the invention provides that the recesses extend in the axial direction over part of or the full height of a wave flank. According to the invention, it can further be provided that the recesses extend in the axial direction over about two-thirds of the axial length of the bushing arrangement. This results in a relatively small volume fraction of damping material out of the total volume of the coupling, resulting in material and weight savings for the same advantageous damping properties. A volume fraction of damping material is, by way of example, from 25 to 33%.

Furthermore, according to the invention it is possible for the recesses to taper in the axial direction. By this measure, too, an additional progression can be achieved or increased by the (conical) slots tapering in the axial direction. This can be effected, additionally or alternatively to the above-described configuration of the recesses narrow gaps. A suitable combination of the formation of the recesses as narrow gaps (for example in C-shape) and of the recesses which are conical in the axial direction can result in a particularly advantageous progressive coupling behaviour.

Depending on the manufacturing expenditure, it is possible for the individual damping blocks to be substantially completely separated from one another in the axial direction. In this connection, it should be noted that even if a thin, non-load-bearing skin or a thin web made of damping material still remains between the individual damping blocks in the axial direction, this has no torque-transmitting or damping property. Such a thin skin or a correspondingly thin web between two damping blocks at the opposite axial ends of the coupling is therefore, according to the invention, still to be understood as the damping blocks being functionally independent of one another.

A development of the invention provides that the radially inner bushing can be pressed onto a shaft neck in a form-fitting manner and in that the radially outer bushing can be received in a receptacle of another shaft neck in a form-fitting manner and be caulked to the latter. This can, however, also be otherwise achieved, for example by an additional securing component, such as for example a securing ring.

Preferably, the damping layer is produced from rubber. As explained above, the damping layer can be calibrated by subjecting it to a compressive prestress by pressing it in or on.

The invention further relates to a method for producing a coupling of the type described above, comprising the steps:
  providing a bushing arrangement having a radially inner and a radially outer bushing,
  fitting a damping layer between the radially inner and the radially outer bushing,
  pressing a crown-like die with projections from one axial side of the bushing arrangement and a crown-like complementary die from the other side of the bushing arrangements into the damping layer in such a way that the damping layer is provided, by the penetrating projections, with axial recesses which extend alternately from both axial ends of the coupling into the damping layer, so that damping blocks are formed at the axial ends of the coupling between the radially inner and radially outer bushing, and
  removing the die and the complementary die.

The invention further relates to a shaft arrangement, in particular a steering shaft for a vehicle steering system having two shaft sections which are to be coupled to one another so as to transmit torque and at least one coupling of the type described above.

The invention is explained below by way of example with reference to the accompanying figures, in which:

FIGS. 12-16 show views of a further embodiment of a coupling according to the invention, with FIG. 12 showing a front view, FIG. 13 showing an axis-containing sectional view along the section line XIII-XIII from FIG. 12;

FIG. 14 showing a cross-sectional view along the section line XIV-XIV;

FIG. 15 showing an enlarged detail from FIG. 14, and

FIG. 16 showing a perspective view.

Figure 1:
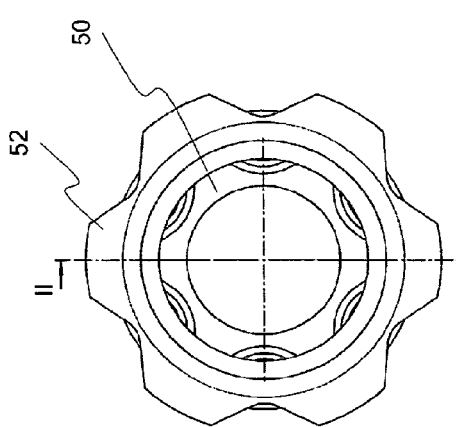
FIG. 1 shows a front view of an arrangement according to the invention of two steering shaft sections which are coupled to one another, via a coupling according to the invention, so as to transmit torque.
Figure 2:
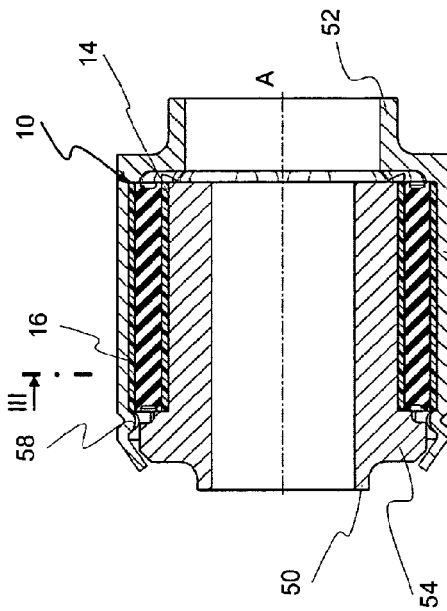
FIG. 2 shows a sectional view along the section line II-II from FIG. 1.
Figure 3:
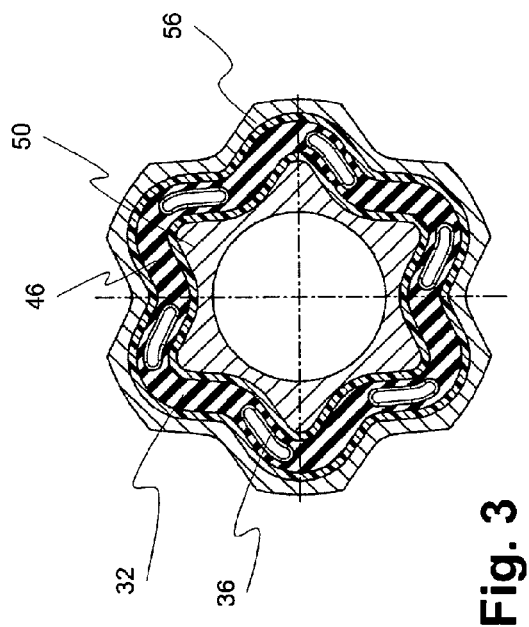
FIG. 3 shows a sectional view along the section line III-III from FIG. 2.
Figure 4:
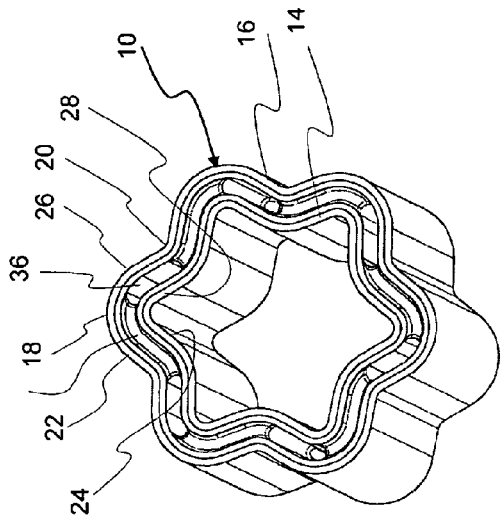
FIG. 4 shows a three-dimensional representation of the coupling according to the invention.
Figure 5:
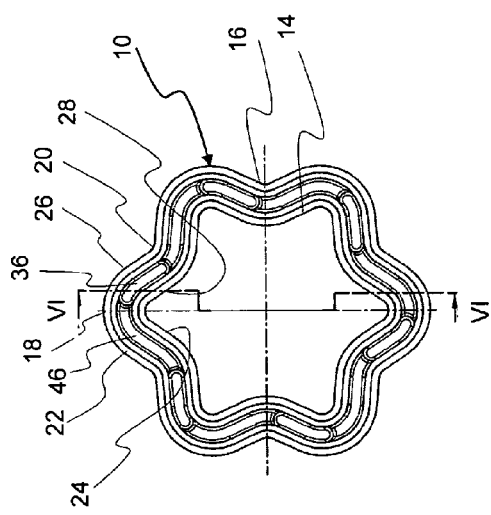
FIG. 5 shows a front view of the coupling from FIG. 4.

In FIGS. 1 to 6, a coupling according to the invention is shown in various views and is generally designated by 10. This coupling comprises a bushing arrangement 12 made of plastic, consisting of two bushings, namely a radially inner bushing 14 and a radially outer bushing 16. The two bushings 14 and 16 have, as can be seen in FIGS. 3, 4 and 5, a rounded star-shaped outer contour, or to put it another way, a wave-shaped closed outer contour. Alternate wave crests 18 and wave troughs 20 thus result. Between a wave crest 18 and a wave trough 20 there extends in each case a flank 22 on the radially outer bushing 16 and a flank 24 on the radially inner bushing 14, respectively. Correspondingly, on the other side of a wave crest 18 there are provided in turn mutually facing flanks 26, 28. Owing to the regular shape of the bushing arrangement 12, in particular of the inner and outer bushings 14 and 16, the arrangement consisting of wave trough 20, wave crest 18 and mutually facing flanks is repeated several times, in the embodiment shown exactly six times.

It can be seen that wave crests 18 and wave troughs 20 are in each case of rounded form. The two bushings 14 and 16 are dimensioned in such a way that an interspace 30 of width b is formed between them. This width b is substantially constant over the entire circumference. A damping layer 32 is fitted in this interspace 30. The damping layer 32 consists of rubber. Recesses 34 and 36, respectively, extend in turn into this damping layer 32 in the axial direction. The recesses 34 and 36, respectively, have a height h which is less than the width b of the interspace 30. Moreover, the recesses 34 and 36, respectively, have an axial length l which is about two-thirds of the axial length L of the coupling 10. Thus, a material skin 40 and 42, respectively, remains adhering to the inner bushing 14 and to the outer bushing 16 in the radial direction on both sides of the recesses 34 and 36.

Damping blocks 44, 46 are formed at the respective axial end of the recesses 34, 36. These damping blocks 44, 46 connect the radially inner bushing 14 to the radially outer bushing 16 so as to transmit torque. As can be seen in the views according to FIGS. 3, 4 and 5, these damping blocks 44, 46 extend in each case between parallel flanks. If, for example, FIGS. 4 and 5 are considered in a clockwise direction, it can be seen that the damping blocks 46 in each case begin in a wave trough 20, extend in the interspace 30 between the two flanks 22 and 24 and end in the region of a wave crest 18. A recess 34 is then provided between the flanks 26 and 28. A corresponding arrangement is then found at the following wave trough when considered in a clockwise direction, etc. The recess 36 is provided on the axially opposite side between the flanks 22 and 24, the damping block 44 there extending between the flanks 26 and 28. It can thus be seen that the damping blocks are arranged alternately at the axial ends between the flanks on both sides of a wave crest and a wave trough, respectively. The damping blocks 44 and 46 are in this case formed substantially independently of one another, i.e. they are not connected to one another via webs running in the axial direction. Admittedly, it is possible for manufacturing reasons for thin webs or a thin rubber skin to remain in the central region of the recesses 34 and 36, respectively. However, these webs or this rubber skin have or has no torque-transmitting or damping property and can therefore be functionally disregarded.

Figure 8:
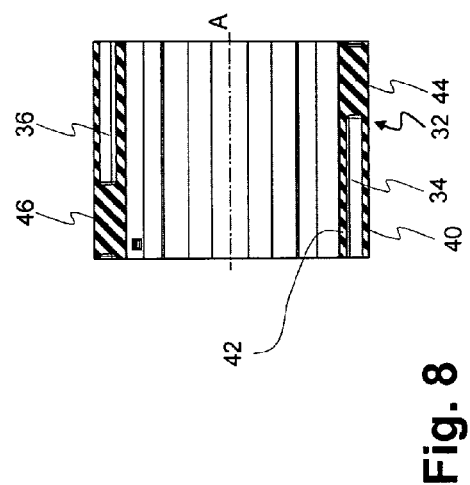
FIG. 8 shows a sectional view along the section line VIII-VIII from FIG. 7.
Figure 7:
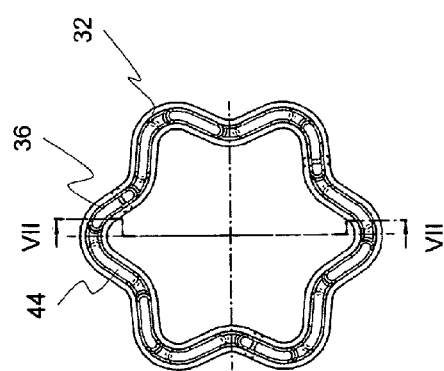
FIG. 7 shows a front view of the damping layer in a single-part representation.

In FIGS. 7 and 8, the damping layer 32 made of rubber can be seen in a single-part representation with the individual components.

FIGS. 1 to 3 show how the coupling 10 connects two steering shaft sections 50, 52 to one another. The steering shaft section 50 has in this case likewise wave-shaped or star-shaped outer contour and is pressed in a form-fitting manner into the radially inner bushing 14. A bearing shoulder 54 is provided for clear axial position definition. By contrast, the shaft section 52 has a hollow receiving bushing 56 which likewise has star-shaped contour. The latter receives the radially outer bushing 16 in a form-fitting manner. For securing, the radially outer bushing is then caulked in the region 58.

Figure 6:
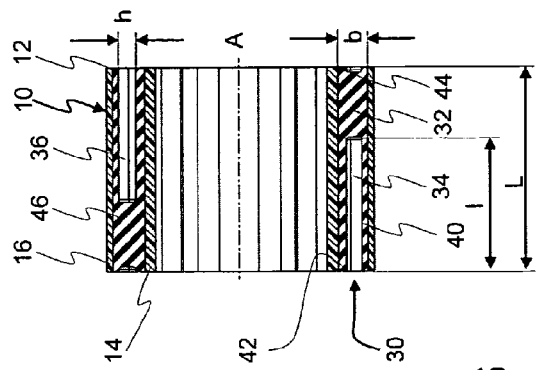
FIG. 6 shows a sectional view of the coupling from FIG. 5 along the section line VI-VI.
Figure 10:
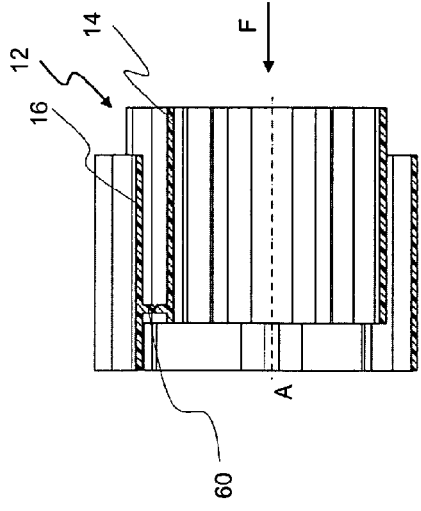
FIG. 10 shows a sectional view of the bushing arrangement along the section line X-X from FIG. 9.
Figure 9:
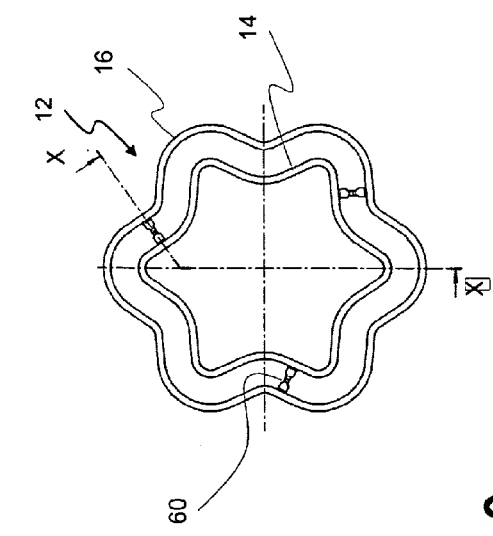
FIG. 9 shows a front view of the bushing arrangement in the initial state.
Figure 11:
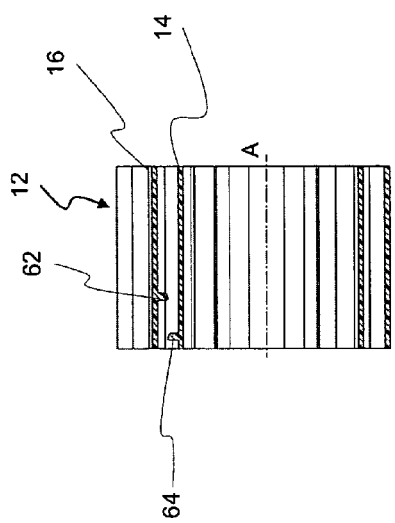
FIG. 11 shows a sectional view corresponding to FIG. 10, but with the predetermined breaking point broken.

FIGS. 9 to 11 show the bushing arrangement 12 in a single-part representation. In the initial state according to FIGS. 9 and 10, the radially outer bushing 16 and the radially inner bushing 14 are coupled to one another via connecting webs 60. The bushing arrangement 12 is formed as a plastics moulded part and is provided in the manner shown in FIGS. 9 and 10. If, in the state according to FIGS. 9 and 10, an axial compressive force F is applied to the radially inner bushing 14 relative to the radially outer bushing 16, the predetermined breaking point in the connecting webs 60 can be broken open and the state according to FIG. 11 is obtained, the webs remaining in two broken fragments 62 and 64. These may be used as radial stops for limiting the maximum radial deflection between the radially inner and radially outer bushing 14 and 16. In the state according to FIG. 11, finally, the damping layer 32 is fitted between the two bushings 14 and 16, so that the coupling corresponding to FIGS. 5 and 6 is obtained. On fitting of the damping layer, the recesses 34 and 36, respectively, are formed by means of crown-like dies and with these consequently the damping blocks 44 and 46, respectively.

FIGS. 12 to 16 show a further embodiment of the invention in various views. In this case, U-shaped recesses 70 are formed in the damping layer 32, the transverse bar 72 of the U extending along the radially outer star-shaped bushing 16 and the two longitudinal limbs 74, 76 of the U running substantially transversely through this damping layer 32. A total of six U-shaped recesses 70 of this type are provided.

In the sectional view according to FIG. 13, it can be seen that the recesses 70 taper conically in the axial direction, i.e. that their clear width in the axial direction decreases. It can be seen in FIG. 14 that approximately in the centre plane of the coupling there are only C-shaped slits remaining, as illustrated in detail in FIG. 15. These are completely embedded in the rubber material of the damping layer 32.

FIG. 16, finally, shows the perspective view.

With the embodiment according to FIGS. 12 to 16, instead of voluminous hollow spaces, it is also possible to form only narrow crescent-shaped gaps 70, tapering conically in the axial direction, in the damping material 32. In the shaping shown, these gaps are deformed, under torsional stress as a result of the load acting, as necessary in such a way that they are completely or only partially compressed to a nominal size of 0. It is thus possible additionally for an additive quasi-hydrostatic component to result in the damping behaviour, which component can markedly increase in particular the torsional stiffness of the coupling. This effect can be intensified by the slits tapering conically in the axial direction.

Overall, according to the invention, an advantageous coupling results which can be simply produced and in which, by suitable dimensioning of the damping blocks, specifically desired torque-transmitting properties can be achieved. In the case of torsional stress, the individual damping blocks are subjected substantially to compressive stress. Depending on the number of wave crests and wave troughs, more or less compressive stress or a greater or lesser reduction of shear stresses can be achieved. The number of wave crests and wave troughs and thus the steepness of the flanks (radial direction component) can be selected depending on the desired torsional stiffness. Likewise, the choice of material for the damping layer and the calibration (compressive prestress) of the latter influences the torsional stiffness. In the axial direction, the coupling is subjected exclusively to shear stress and is relatively soft. In the case of bending stress, the coupling is in turn subjected substantially to compressive stress, where, depending on the severity, also shear components can be permitted or suppressed to a greater or lesser extent.

The solution according to the invention results in a coupling according to the tube-in-tube principle which can be cost-effectively produced, is soft in the axial direction and can be mounted relatively simply. By forming the recesses in the damping layer, considerable material can be saved, in particular material in the central region of the coupling. It has been found that damping material in the central region of the coupling makes to the a relatively small contribution to the damping and torque transmission in the above-mentioned loading cases, so that this material can be readily saved.

The invention claimed is:

1. A coupling for connecting two shaft sections of a steering shaft for a vehicle steering system, in a damping manner, the coupling comprising:
    a bushing arrangement having, with respect to a central longitudinal axis, a radially inner bushing and a radially outer bushing, wherein the radially inner bushing can be coupled to a first shaft section and the radially outer bushing can be coupled to a second shaft section so as to transmit torque, wherein a damping layer is provided between the radially inner bushing and the radially outer bushing, wherein the bushing arrangement has a circumferentially wave-shaped contour, as viewed in the direction of the longitudinal axis,
    wherein the radially inner bushing and the radially outer bushing have intermeshing wave contours, wherein the damping layer is provided with axial recesses, which extend alternately from both axial ends of the coupling into the damping layer, so that damping blocks are formed alternately, as viewed in the circumferential direction, at the axial ends of the coupling between the radially inner and radially outer bushing, and wherein the axial recesses are enclosed by the material of the damping layer.

2. The coupling according to claim 1, wherein the bushing arrangement has a star-shaped contour, as viewed in the direction of the longitudinal axis.

3. The coupling according to claim 1, wherein the bushing arrangement in its initial state is formed as a one-piece component, wherein the radially inner bushing is connected to the radially outer bushing via at least one connecting web which is formed as a predetermined breaking point and can be broken open by relative displacement of the radially inner bushing with respect to the radially outer bushing.

4. The coupling according to claim 1, wherein the bushing arrangement is produced from plastic.

5. The coupling according to claim 1, wherein the damping blocks are arranged between the radially inner and radially outer bushing in each case in the region of a flank of an individual wave.

6. The coupling according to claim 5, wherein the damping blocks extend in each case from the wave trough to the wave crest.

7. The coupling according to claim 5, wherein the damping blocks are provided at one axial end of the coupling on the respectively leading flank of the individual waves and at the other axial end of the coupling on the respectively trailing flank of the individual waves, as viewed in the circumferential direction about the longitudinal axis.

8. The coupling according to claim 1, wherein the axial recesses have rounded a geometry adapted to a wave course.

9. The coupling according to claim 1, wherein the axial recesses have a rounded, angular, C- or U-shaped contour in cross-section.

10. The coupling according to claim 1, wherein the axial recesses extend in the axial direction over part of a height of a wave flank.

11. The coupling according to claim 1, wherein the axial recesses extend in the axial direction over about two-thirds of an axial length of the bushing arrangement.

12. The coupling according to claim 1, wherein the recesses taper in the axial direction.

13. The coupling according to claim 1, wherein the individual damping blocks are substantially completely separated from one another in the axial direction.

14. The coupling according to claim 1, wherein the radially inner bushing can be pressed onto a shaft neck in a form-fitting manner and in that the radially outer bushing can be received in a receptacle of another shaft neck in a form-fitting manner and be caulked to the latter.

15. The coupling according to claim 1, wherein the damping layer is produced from rubber.

16. A steering shaft for a vehicle steering system, comprising two steering shaft sections which are to be coupled to one another so as to transmit torque, having at least one coupling according to claim 1.

* * * * *